E. C. OWEN.
ANIMAL TRAP.
APPLICATION FILED FEB. 8, 1916.
1,207,991.
Patented Dec. 12, 1916.
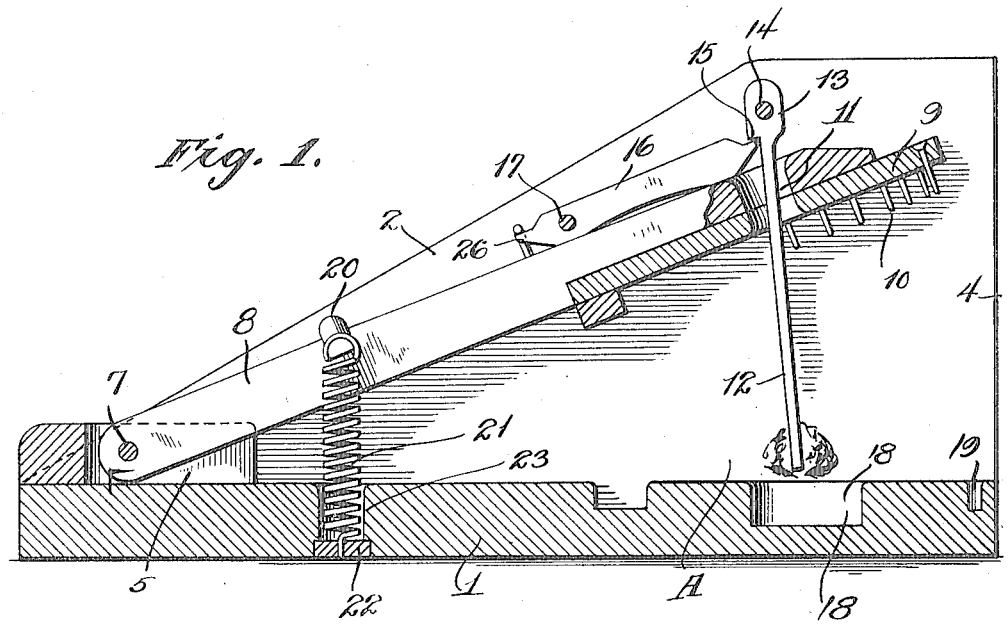
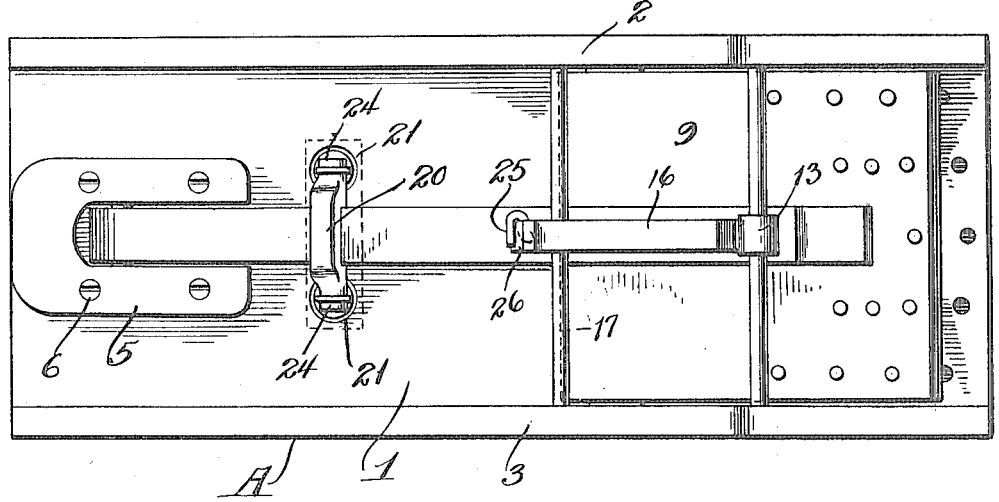
WITNESSES
INVENTOR
Elmer C. Owen
BY
ATTORNEY

UNITED STATES PATENT OFFICE.

ELMER C. OWEN, OF LORAIN, OHIO.

ANIMAL-TRAP.

1,207,991.  Specification of Letters Patent.  Patented Dec. 12, 1916.

Application filed February 8, 1916. Serial No. 77,066.

*To all whom it may concern:*

Be it known that I, ELMER C. OWEN, a citizen of the United States, residing at Lorain, in the county of Lorain and State of Ohio, have invented certain new and useful Improvements in Animal-Traps, of which the following is a specification.

This invention relates to animal traps and has for its primary object to provide for catching rodents and small animals in a manner that will kill the rodent or animal the instant that the trap is sprung.

A further object of this invention is the provision of an animal trap, the operating spring of which may be adjusted in its tension to slightly or heavily crush the animal caught in the trap, thus providing for the capture of animals whose skins are desired to be preserved without mutilation.

A further object of this invention is the provision of an animal trap which will have a minimum of mechanical appliances in view of the animal.

In the drawings, Figure 1 is a vertical longitudinal section through the trap. Fig. 2 is a top plan view of the trap.

Referring now to the drawings wherein is illustrated the preferred embodiment of my invention, the letter A designates the base upon which the operating means is mounted and consists in a base plate 1 of substantially rectangular formation and the side walls 2 and 3 which are substantially triangular in shape and which recede toward the back of the trap, thereby providing an inlet 4 of large enough area to admit the passage of small animals and rodents.

A U-shaped member 5 is secured to the base plate 1, by screws 6, and a trunnion 7 is mounted in the U-shaped member 5 which acts as pivot for a striker arm 8. A plate 9 is securely mounted to the end of the striker arm 8, opposite its pivot point and is rectangular in shape and designed to snugly fit within the side walls 2 and 3 of the trap. Spikes or prongs 10 are arranged near the front end of the plate 9 in staggered relation to each other and serve to tightly clasp or crush the animal which should be caught within the trap. The striker arm 8 and the compression plate 9 have extending vertically therethrough, an opening 11, through which a baiting trigger 12 is extended and adapted to receive a piece of meat or other suitable baiting material. The opposite end of the baiting trigger 12 is provided with an enlarged head 13 through which a pivot rod 14 is extended and which is mounted in side walls 2 and 3 of the trap. A shoulder 15 is also provided in the end 13 of the baiting trigger and this shoulder is adapted to receive a latch trigger 16, which is mounted on the pivot 17 which is also mounted in the side walls 2 and 3 of the trap.

A recess or depression 18 is provided in the base plate 1 of the trap, situated directly beneath the baiting trigger 12. This recess 18 provides for the reception of the baiting material when the trap is sprung in order that the baiting material may not interfere with the close contact of the plate and the base plate, in the event of very small animals entering the trap. Depressions 19 are also provided in the base plate for the reception of spikes or prongs 10 which are carried by the plate 9. A yoke 20 is adapted to straddle the striker arm 8 and to be loosely mounted thereon, in order that it may be moved to any desired position along the striker arm 8 for the purpose hereinafter explained.

A pair of tension springs 21 are attached to the under side of the base plate 1, by means of a securing plate 22 and are adapted to extend through the openings 23 provided in the base plate and to be secured to the ends 24 of the yoke member 20.

A clip or hook 25 is secured to the striker arm 8 at a point near the pivot rod 17 and is adapted to receive the bevel end 26 of the latch trigger 16.

To set the trap for catching a rodent, the plate is raised to the position shown in Fig. 1, by swinging it upon the pivot which is provided for in the striker arm 8 and the latch trigger 10 brought into position under the shoulder 15 of the baiting trigger 12 and the clip 26 securely brought over the end 26 of the trigger 16.

The force given to the plate to catch the animal is obtained by the tension springs 21 and these springs may be adjusted to exert a lesser or greater amount of tension upon the striker arm 8, by moving the yoke 20 along the striker arm 8 to the position obtaining the most desirable tension of the springs 21.

Assuming that the spring 21, in the position in which it is shown in Fig. 1 of the drawing, is at its limit of extension. The plate 9 will, when the trigger means is released, strike the animal with a terrific blow caused by the great tension on the spring 21. To lessen the tension on the spring it is merely necessary to move the yoke longitudinally on the striker arm 8 and, even though the coils of the spring are not disposed in alinement, by reason of the spring bending from the corners of the recess, the tension will be lessened and the result will be that the plate 9 will strike the animal with considerably less force.

I claim:

1. An animal trap comprising a base, a striker arm pivotally mounted upon the base, a pair of contracting springs connected to said base and to said striker arm, the connection of said springs with said striker arm comprising a yoke adapted to be manually moved for adjusting the tension of said springs, and means for releasably holding the striker arm in raised position.

2. An animal trap comprising a base, a striker arm pivotally mounted upon said base, a plate carried by said striker arm, a latch trigger pivotally mounted and releasably engaging said striker arm, a bait trigger releasably engaging said latch trigger, and spring means secured to said base and loosely connected to said striker arm whereby the connection of said spring means with said striker arm may be varied for adjusting the tension of said spring means to vary the force of the blow exerted by said striker arm when said latch trigger is released.

3. An animal trap comprising a base, a striker arm pivotally mounted on said base, means releasably retaining said striker arm in raised position, a yoke straddling said striker arm and resilient means connecting said yoke with said base, said yoke being longitudinally adjustable on said striker arm for causing the said resilient means to vary the force of the blow of said striker arm.

4. An animal trap comprising a base, a striker arm pivotally mounted on said base, a yoke straddling said striker arm, said base being provided with a depression in its bottom face and a pair of openings extending through said base and communicating with said depression, tension springs mounted in said openings and connected at their upper ends to said yoke, a securing plate disposed within said depression and connected to the lower ends of said springs, and means releasably retaining said striker arm in raised position.

5. An animal trap comprising a base, a striker arm pivotally mounted on said base, means releasably retaining said striker arm in raised position, a securing plate carried by said base, and spring means fastened to said securing plate and loosely connected to said striker arm whereby the connection of said spring means with said striker arm may be varied for adjusting the tension of said spring means to vary the force of the blow exerted by said striker arm when said first mentioned means is released.

In testimony whereof I affix my signature in presence of two witnesses.

ELMER C. OWEN.

Witnesses:
W. M. MOORE,
A. E. CAMERON.